Nov. 11, 1941.  R. H. TURK  2,262,069
MELTING AND FINING OF VITREOUS ENAMELS
Filed Nov. 15, 1938
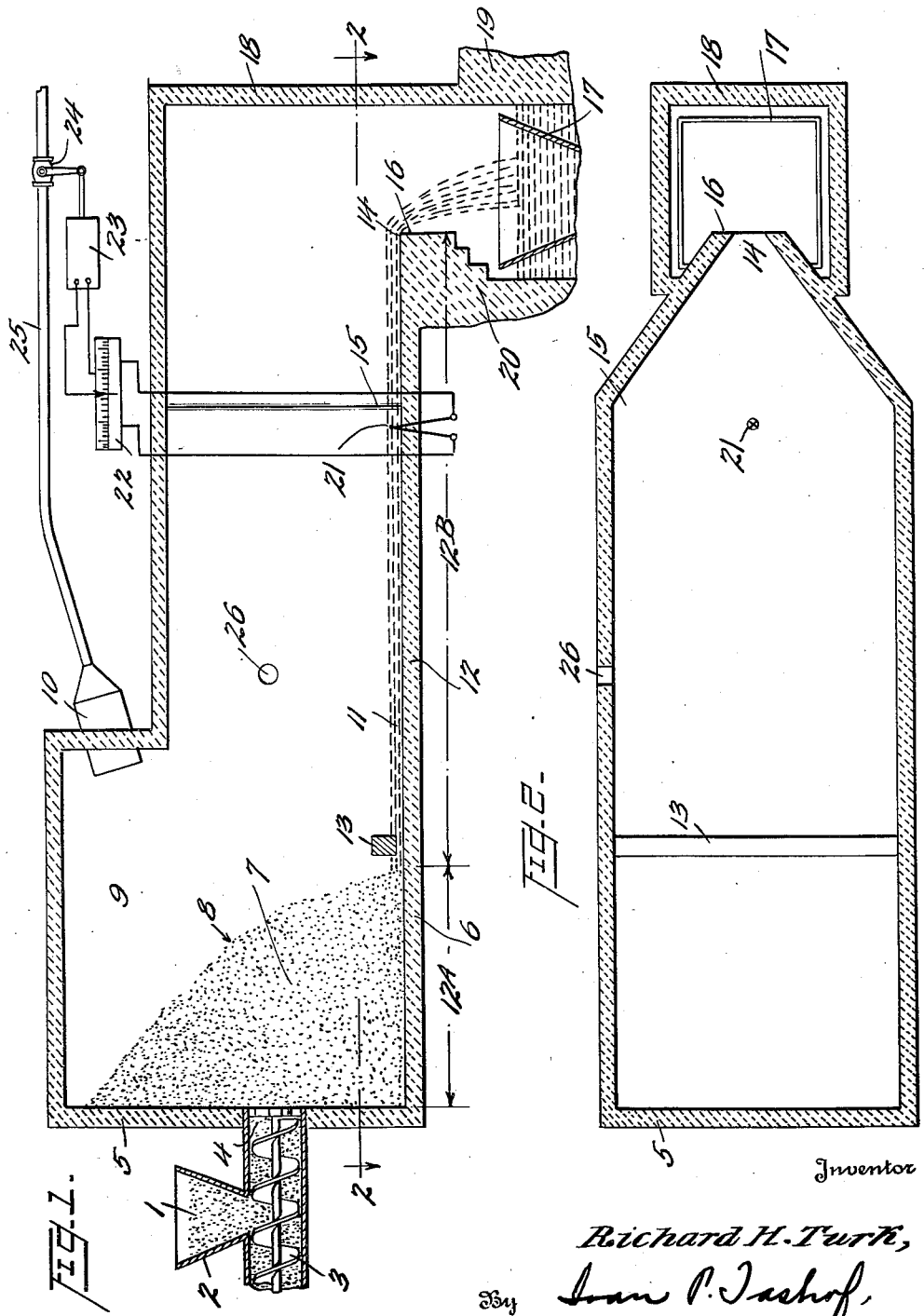
Inventor
Richard H. Turk,
By Ivan P. Tashof,
Attorney Patented Nov. 11, 1941

2,262,069

UNITED STATES PATENT OFFICE 2,262,069

MELTING AND FINING OF VITREOUS ENAMELS

Richard H. Turk, Baltimore, Md., assignor to The Porcelain Enamel & Manufacturing Company of Baltimore, Baltimore, Md., a corporation of Maryland Application November 15, 1938, Serial No. 240,589

14 Claims. (Cl. 49—77)

The present invention relates to the production of vitreous materials and more particularly to vitreous or porcelain enamels, and ceramic glazes.

While it is highly desirable that vitreous enamels have uniform physical and chemical properties, it has hitherto been impossible to achieve this result, this in a measure being due to the fact that vitreous enamels are not smelted to a chemical equilibrium so that they are free of bubbles or seeds as is the case of ordinary glass. On the contrary, the constituents of the vitreous enamel charge are fused, brought to a fluid state, and then heated in the fluid state until chemical reactions between the charge constituents have proceeded to a certain definite point, whereupon the fused vitreous or porcelain enamel material is quickly quenched and comminuted to yield a material with the desired physical and chemical properties required for the vitreous and porcelain enameling of metals.

It is of importance for each kind of enamel to control the exact temperature at which the chemical interaction between the charge constituents is interrupted and the material quenched and in a continuous process of smelting enamels, it is desirable that at or near the discharge end of the fining hearth, the optimum temperature be maintained constant so that there is produced at all times an enamel having uniform chemical and physical properties.

In general, it may be stated, that if the smelting or melting of the enamel constituents be carried too far toward chemical equilibrium, the resulting material will be unsuitable for use as a porcelain enamel. If the enamel is a base-coat enamel, it will not properly cover or adhere to the metal; it will not display the proper suspension characteristics when milled for application; and upon application will not drain properly. If the over-smelted enamel be a finish or so-called "cover-coat," the enamel may lack opacity, be of poor color, be pitted, have a poor or "fuzzy" surface and have other properties making it entirely unsuitable for use.

If the smelting procedure be terminated too quickly or before the proper interaction has been effected between the charge constituents, the resulting enamel likewise will have physical and/or chemical properties making it unsuitable for use. For example, if ground-coat enamels are undersmelted, the resulting enamel will not have the proper suspension and draining properties and the resulting fined enamel may have ridges, grooves and in general, a rough surface, all of which is undesirable. Further, the under-smelting may result in a surface having pits, blisters or fish scales. Under-smelting of the cover-coat enamels may result in poor color, improper opacity, poor gloss, pits, blisters and under some circumstances, in general, a "fuzzy" surface. The term "fuzzy surface" is one used in the art to indicate that the surface lacks apparent continuity, that is, it is so broken by minute bubbles or blisters that images reflected therefrom appear distorted.

In the past, it has been the practice to melt or smelt porcelain enamel raw materials in amounts ranging from 100 to 3,000 pounds in a rotary or in a reverberatory smelter, the latter being known as a "box type" smelter. In a reverberatory furnace, the material is simply charged on the hearth of the furnace and heated until, in the opinion of the operator, the chemical interaction between the charge constituents has proceeded to the proper point, whereupon the smelted charge was tapped into a quenching bath. In this method of smelting, a part of the batch may be under-smelted, a part over-smelted, and some of the batch may be properly smelted. Further, different batches will differ in the proportion of the batch which is properly smelted, under-smelted or over-smelted. Some of the batches may consist predominantly of under-smelted material, predominantly of over-smelted material or predominantly of material which has been properly smelted. It is clear that the batch method of operation has provided a fused enamel or frit which is deficient in uniformity. Again, different batches of the enamel will differ in chemical and physical properties because of the different conditions under which the enamels have been smelted. These continuous variations of physical and chemical properties from batch to batch is obviously undesirable.

In order to eliminate the defects inherent in batch smelting, a method of continuously smelting enamel under closely controlled conditions has been proposed, said method being set forth in my Patent No. 2,137,930, granted November 22, 1938. In accordance with said method, the raw enamel material is charged onto an inclined smelting hearth to form a reservoir of raw enamel material, said reservoir-material being preheated. The exposed face of this material-reservoir is sintered and/or melted and rolls and flows down the face of the reservoir to form a stream of flowing molten enamel which flows down the face of the hearth in a relatively thin stream and is subjected as it flows to a bath of combustion gases, the latter being adequate to substantially prevent the loss of heat units from the bath by radiation or conduction. It may be pointed out that in the prior method, while the temperature of the combustion chamber was controlled, or an attempt was made to control the same, there was no attempt to control the temperature of the molten vitreous enamel as it reached the discharge point, just prior to the quenching of the enamel. Therefore in said continuous process some of the enamel was subjected to quenching at one temperature and other portions of the enamel was subjected to quenching at a different temperature, this being due, to the variation in the temperature of the bath of combustion gases and the volume thereof in the fining zone and particularly at and adjacent the discharge zone. Further, the flow of the combustion gases over the enamel in the fining zone was affected by the draft on the furnace and the outside atmospheric conditions. In the method set forth in the prior application, the degree to which the enamel was over or under-smelted was greatly reduced and a far more uniform enamel or frit was produced. However, said method of smelting is in accordance with the present invention further improved to produce a fused enamel or frit having still more uniform physical and chemical properties and this, in a large manner, is brought about by preventing the combustion gases from passing over the melted enamel as it is being fined.

It has been ascertained that if intermediate the inlet end of the smelter and the discharge end of the smelter, and preferably adjacent the discharge end thereof the fining hearth is constricted, the depth of the molten vitreous enamel on the hearth is in proportion to the fluidity of the molten enamel. Since the fluidity of the liquid or molten material decreases with the decreasing temperature, if the temperature at such constricted section is maintained constant, the fluidity of the molten enamel or the like will be maintained constant, and as pointed out, the depth of the stream of the molten enamel will be constant. Of course as the fluidity of the mass increases, the viscosity of the mass decreases.

In accordance with one form of the present invention, it is proposed to maintain a uniform degree of interaction between the constituents of the enamel stream, and a uniform fining action, by maintaining constant the viscosity, the depth and the temperature of the flowing stream of enamel, at and adjacent said constricted fining zone, so that the resulting quenched vitreous material, such as porcelain enamel, will possess uniform physical and chemical properties.

In accordance with the present invention, it is also proposed to supply substantially all the thermal units necessary for the conversion of the raw enamel material to finished fused enamel at the face of the raw material reservoir, and allow the enamel material containing the thermal units necessary for its smelting and fining to be carried onto the smelting hearth. This is in contradistinction to the prior practice of supplying a part of the thermal units at the face of the raw material reservoir and the remainder of the thermal units by combustion gases passing over the enamel material on the smelting and/or fining hearth. When all of the thermal units necessary for smelting or fining are supplied at the face of the raw enamel reservoir, the rate of reaction between the constituents of the raw enamel charge may be closely controlled by coordinating the temperature of the enamel at the discharge end of the hearth with the temperature of the combustion chamber. Utilizing this feature of the present invention allows a longer smelting action at a lower temperature thus preventing the possible loss of volatile constituents from the enamel, such as may be encountered when the enamel is allowed to flow over the hearth in a thin stream. Stating this aspect of the invention slightly different, the required thermal units for the carrying on of the chemical interaction in the fining of the enamel on the fining hearth and somewhat during the smelting of the enamel on the smelting hearth, are contained in the molten stream of enamel and are not supplied from an extraneous source.

It is further proposed, in accordance with the present invention to maintain a stream of molten enamel of such depth that it will have sufficient thermal capacity to maintain the temperature of the stream sufficient for proper flow and reactivity, said deep stream of molten enamel being preferably maintained in the absence of the passage of combustion gases over the fining hearth, or at least, the major portion thereof.

The present invention is directed in one of its forms to a method of continuously melting and smelting vitreous enamels in a smelter having a melting zone and an enamel fining zone having a constricted portion, said method comprising introducing into the smelter a raw enamel charge melting said charge, forming therefrom a flowing enamel stream, and maintaining substantially constant the temperature of the enamel at and adjacent the constricted fining zone.

In order that the present invention may be clearly understood it will be described in connection with the following drawing in which:

Figure 1 is a somewhat diagrammatic cross-section of a continuous smelter, and

Figure 2 is a horizontal cross-section taken on line 2—2 of Figure 1.

In the smelter shown in Figure 1, the raw enamel material 1 is charged through a hopper 2 from which it is fed by means of a screw conveyor 3 through the charging port 4 of the rear wall 5 of the furnace to the charging hearth 6, where it forms the raw material reservoir 7, said reservoir having an exposed face 8, the latter being allowed to form at its normal angle of repose. While this face may be considered, for purposes of illustration, as a single face, it is desired to point out that the contours of said face are the result of natural forces acting on the face of the reservoir pile as the melting and charging operations continue. Thus, the face may not be continuous in any given direction, but may change continuously as the melting and charging operation proceeds. For example, the contour of face 8 may at one time take the form of a segment of a cone and another time it may take the form of an inclined plane, or it may roughly approximate a portion of a pyramid. The face 8 of the raw material reservoir 7 is maintained in a direct contact with the combustion gases present in combustion chamber 9, said gases being introduced into the chamber from the combustion burner 10. The combustion gases impinge on the face 8 of the reservoir and not only partially fuse and/or sinter the material present on the face, but also function to pre-heat the raw enamel material present in the reservoir so that by the time the enamel material reaches the face 8, it is almost at the fusion temperature and rapidly sinters and/or partially fuses upon reaching the reservoir face 8. In accordance with the present invention the combustion gases are preferably exhausted through the port 26 in the side wall of the furnace to thereby substantially prevent their passage over the major portion of the flowing stream of enamel present on the fining hearth. Instead of exhausting all of the combustion gases, merely a portion thereof may be exhausted and the remaining portion allowed to contact the flowing enamel to bring up the heat content of the enamel when this is necessary. Usually the use of merely a portion of the gases will not be necessary and the fining may be effected in the substantial absence of combustion gases, but for certain specific cases it can be used as will be more fully pointed out later on.

The sintered and partially fused raw enamel material falls and slides down the face 8 and forms a stream of molten enamel 11, which passes along the hearth 12 said numeral identifying the entire hearth, the latter being divided into a melting zone 12A and a fining zone 12B. It is to be understood that there is no sharp demarcation between the melting and/or smelting hearth and the fining hearth, but that these grade imperceptibly one into the other. As the molten enamel stream 11 passes along the melting and smelting hearth 12A, it passes under the floating bridge wall 13, the latter functioning to remove any under-smelted raw enamel material. It is desired to point out that the position of the floating bridge wall 13 may be varied for various types of porcelain enamel. For example, in enamel where a long fining action is desirable the bridge wall 13 is placed as close as possible to the raw material reservoir 7, thereby preventing any imperfectly fused material from passing to the fining hearth 12B. Alternately, where a short fining action is desirable, the floating bridge wall 13 may be moved toward the discharge end 14 of the hearth 12. This allows the non-fused material to float farther through the smelting zone and retards the fining action of the completely fused material. As the molten enamel passes along the melting and fining hearth, it carries with it the thermal units picked up in the combustion chamber 9 and the material continues to react.

It is clear from the above that the utilization of the floating bridge 13 provides a method of controlling the respective melting and fining periods to which the enamel is subjected. In other words the characteristics of the enamel may be controlled by controlling the position of the floating bridge 13. For example, if it is desired to make the enamel more opaque the bridge wall 13 will be moved toward the discharge end 14 and if it is desired to lessen the opacity, the bridge wall 13 may be moved closely toward the charging end of the hearth.

It is to be noted that at point 15 of the hearth, the cross-section of the hearth is constricted to restrain the flow of the molten enamel or vitreous material and maintain the flowing stream at a proper depth which, as hereinafter pointed out for a flat hearth will be between about 2 and 2½ and 6 inches.

The molten enamel flows over the lip 16 and falls into a quenching vessel 17 where it is rapidly chilled and comminuted. The quenching vessel 17 is positioned between an extension 19 of the furnace wall 18 and a wall 20 preferably integral with the hearth 12, said arrangement preventing the molten enamel from being cooled by the air as it passes from the furnace hearth to the quenching vessel.

The temperature of the flowing enamel stream 11 is continuously measured at the zone 21 by any suitable heat-measuring instrument as, for example, a thermo-couple or a continuously recording optical pyrometer 22. The latter is connected to a valve-operating mechanism 23 which controls valve 24 in fuel-supply line 25. For a given enamel the pyrometer 22 is set at a predetermined enamel temperature. Any increase of the temperature of the vitreous or porcelain enamel at the point or zone 21 over the predetermined fining temperature will cause the valve-operating mechanism 23 to gradually increase the closure effect of the valve 24 and thereby reduce the amount of fuel passing per unit of time through the fuel-supply conduit 25, and into the combustion chamber 9. The feeding of less gas reduces the temperature at the material face 8 and the enamel material melts slower whereby per unit of time less molten enamel passes onto the melting and smelting hearth 12, with the result that the temperature at the point or zone 21 of the hearth is reduced.

Similarly, any decrease in the temperature of the molten enamel at the point or zone 21 will cause the mechanism above set forth to increase the fuel supply per unit of time to the combustion chamber 9 and raise the temperature thereof.

By controlling the temperature of the molten enamel at the point 21 and keeping it at a predetermined constant optimum, all of the enamel continuously being smelted and fined will have the same fluidity or viscosity and, the degree of completion of the chemical interaction between the enamel ingredients will be constant and/or closely controlled to thereby produce an enamel having uniform physical and chemical properties. It is, of course, obvious that the melting and fining temperatures of different enamels will differ. For example, it may be desirable to melt a given enamel at 2100° F., and maintain the temperature at and adjacent the point 21 or the constricted zone adjacent thereto at 1900° F., while a different enamel melting at 2300° F. will be maintained at 2000° F. at the constricted zone.

It is proposed in the preferred form of the present invention to melt, smelt and fine on a flat hearth having present a deep bath while at the same time maintaining a uniform degree of interaction between the constituents of the enamel stream, and a uniform fining action, said interaction and fining action being effected by maintaining constant the viscosity and temperature of the flowing enamel at and adjacent its constricted portion. What is meant by the term "a deep bath" will be clear from the following. In my prior continuous smelting application, the enamel is smelted on an inclined hearth, and the depth of the enamel stream is of the order of 1½ to 2 inches or less, depending upon the inclination of the melting and fining hearth. This depth of stream does not carry sufficient thermal units to maintain the heat of the stream, and therefore, unless the flowing stream of molten enamel be bathed in combustion gases continuously, so much of the heat is lost, in some cases, that the temperature of the flowing molten stream is reduced below satisfactory reaction temperatures. Such a stream is not considered a deep stream. Any stream having a depth conferring upon the stream sufficient thermal capacity to maintain the temperature of the stream at a point sufficient for proper flow and reactivity while substantially inhibiting flash surface over-smelting may be considered a "deep bath." Using a flat hearth, a stream having a depth of between about 2 to 2½ to 6 or 7 inches comes within the latter definition, and may be considered a "deep bath." The problem which applicant is solving may be stated in a slightly different manner as follows. According to the prior methods, the enamel was passed over the hearth of the smelter in a thin stream, that is a stream approximating 1½ to 2 inches in depth. Due to the fact that this thin stream, heated to a given temperature did not carry sufficient thermal units to effect the desired fining, it was necessary to bathe the surface of the thin bath of vitreous enamel with a blanket of combustion gases in order to conserve the heat energy present in the bath; that is to prevent said heat energy from being dissipated by radiation to the crown and walls of the furnace or by direct conduction to the hearth of the furnace. Since in the prior methods the combustion gases were obviously maintained at a higher temperature than the stream of vitreous molten enamel, it was not possible in actual practice, to control the ratio between the heat carried by the combustion gases and the heat carried by the molten enamel and to simply replace or prevent any loss of heat by the molten enamel itself. In actual practice it was necessary to prevent the molten enamel from cooling down, and as a matter of fact the surface layer of the molten enamel was actually heated so that its temperature was materially increased and as a result, this enamel, in many cases, was slightly over-smelted. In accordance with the present invention in its preferred form, it is possible by utilizing the deep bath to eliminate entirely the necessity for bathing the molten stream with combustion gases since the molten vitreous enamels contain adequate latent heat to allow for any radiation losses while at the same time containing sufficient heat within the molten stream to properly carry out the fining step. The term "deep bath" distinguishes from the term "shallow bath" which has been used up to the present time in the continuous smelting of vitreous enamels and the term "deep bath" may be defined as a bath having a depth such that the molten enamel contains adequate latent heat to allow for the proper fining of the enamel without imparting to the enamel additional heat units from any extraneous source. However, it is to be understood that some departure from the above figures is permissible and both will still come within the spirit of the present invention. In order to allow for some variation the depth of the bath has been defined in a functional manner.

The deep stream permits the streams to carry sufficient thermal units to provide for interaction between the charge components and thereby eliminates the necessity of bathing the flowing stream in combustion gases. With the substantial presence of combustion gases eliminated, there is little flash surface over-smelting. Even with combustion gases eliminated, there is some opportunity for flash surface over-smelting, but this is inhibited or minimized by having a deep bath, as for example, 2 to 2½ to 6 or 7 inches. By "flash surface over-smelting" is meant the tendency of the enamel on the surface of the flowing stream to be "over-fined." The use of a deep bath on a flat hearth makes the bath more susceptible to accurate temperature and viscosity control. The deep bath also enables a maximum opacity to be easily attained. Utilizing a flat hearth, and a deep bath in the absence of combustion gases, the rate of reaction between the constituents of the raw enamel charge may be closely regulated or controlled by coordinating the temperature of the enamel at and adjacent the constricted zone and/or discharge zone of the bath with the temperature of the combustion chamber, the temperature at the constricted or discharge zone being held substantially constant. While the invention may also be practiced in a smelter in which no constricted zone is used, it is preferred to use a constricted zone.

In the following examples there are illustratively set forth typical ground-coat, opaque or cover-coat enamels and clear enamels which may be smelted in accordance with the present invention.

Table I

| Raw material | 1<br>Ground or base coat enamel | 2<br>Opaque or cover coat enamel | 3<br>Clear enamel |
|---|---|---|---|
| | Per cent | Per cent | Per cent |
| Flint | 29.0 | 21.7 | 30 |
| Feldspar | 22.0 | 19.3 | 24 |
| Borax | 30.0 | 27.6 | 29 |
| Soda ash | 5.0 | 4.1 | 10 |
| Soda niter | 4.6 | 2.7 | 3 |
| Fluorspar | 6.0 | 6.2 | |
| Cobalt—sesquioxide | 0.4 | | |
| Manganese dioxide | 2.0 | | |
| Nickel oxide | 1.0 | | |
| Zinc oxide | | 4.8 | |
| Cryolite | | 9.5 | 4.0 |
| Antimony oxide | | 4.1 | |

Referring to the ground-coat enamel set forth in the above table, the enamel is smelted with a combustion zone temperature of 2150° F. and a discharge temperature of about 2050° F. The enamel bath has a depth of about 3½ inches.

Referring to the cover-coat enamel set forth in column 2, the enamel is smelted at a combustion temperature of 2050° F. and a discharge temperature adjacent the constricted zone of about 1850° F., the depth of the enamel bath being from 3 to 3½ inches.

Referring to column 3 of the above table, there is set forth a clear enamel, that is an enamel in which no opacifying material is present, the finished frit in its finished state being substantially transparent. This enamel may be smelted at a combustion zone temperature of 2150° F. and the discharge temperature at or adjacent the constricted zone is 2000° F. The depth of the enamel bath is 1½ to 2 inches. In producing a clear transparent vitreous enamel it is desirable to heat the enamel to a high temperature in order to make substantially certain that any ingredients producing opacity such as fluorine are removed from the glass. The clear vitreous enamel cannot be smelted with a deep layer, as for example, 2½ to 3½ inches, because the use of a deep layer tends to keep the opacifying agents in the enamel. Therefore, since it is necessary in producing a clear vitreous enamel to use a thin layer, it is in many cases impossible to impart to the molten stream of clear enamel the thermal units necessary to melt and to effect the desired fining by the interaction of the charge components. In such a case, a portion of the combustion gases may be passed over the fining bath to impart to the bath of clear enamel which is being fined, a portion of the thermal units necessary to effect the desired fining and interaction of the charge components. This step of splitting the combustion gases may be used with or without a constricted zone or with and without a constricted zone and/or a temperature control at and adjacent the constricted zone as hereinbefore pointed out. There may be other enamels which it is necessary to smelt at a high temperature and in a thin layer and for such enamels the step of splitting the combustion gases may be utilized. The operator skilled in the art can easily determine the amount of the gases which it is necessary to pass over the clear enamel bath or the like.

In general the depth of the bath, combustion temperature and discharge temperature for ground-coat, cover-coat and clear transparent frits are set forth in the following table.

*Table II*

|  | 1 Ground coat | 2 Cover coat | 3 Clear |
|---|---|---|---|
| Depth of bath............inches.. | 3½ | 2½ to 7 | 1½ to 2 |
| Combustion zone temperature °F.. | 2100±150 | 2000±150 | 2100±150 |
| Discharge temperature......°F.. | 2050±150 | 1900±150 | 2050±150 |

While by far the best results are obtained by smelting and fining on a flat hearth, the present invention in all its variations, as above set forth, may be practiced on a hearth having a slight inclination varying from about 1 inch in 15 feet of hearth to 4 inches in 15 feet of hearth. The outstanding advantage of the use of a flat hearth is that the flow of the enamel along and over the hearth may be better controlled.

The present invention is applicable to sheet iron enamels, cast iron enamels, ground-coats, cover-coat enamels and glazes. It may also be used to produce clear enamels, and acid-resisting enamels.

The present invention enables the continuous production of vitreous or porcelain enamels, having uniform properties that is to say, that samples tapped at any time during the continuous run will exhibit substantially the same solubility in water during and after milling; hardness; brittleness; friability; thermal properties when applied to a metal base as for example, iron; adherence; and opacity.

While the present invention has been illustrated in a method employing a liquid or gaseous fuel as the heating medium, it is desired to point out that the charge may be preheated and/or melted and/or fined by thermal units electrically generated.

It is desired to point out that in the preferred form of the invention only a relatively small portion of the fining hearth is constricted, as for example one-fifth of the length of the fining hearth, such constriction occurring at or near the discharge end. However, it is recognized that the amount of the fining hearth that is constricted may be increased or decreased and still come within the spirit of the present invention. In other words, the fining portion is carried out in accordance with the present invention preferably on a hearth the major portion of which is unconstricted and the minor portion constricted, said constriction being at or adjacent the discharge end of the hearth.

It is thought to be broadly novel to continuously fine vitreous enamel and particularly porcelain enamel by imparting to the stream of enamel at the initiation of its flow all of the thermal units necessary to effect during fining the desired interaction between the stream constituents, and this irrespective of whether the fining is carried out on a flat hearth or on an inclined hearth, or on a constricted hearth, or with the temperature of the fining bath at any intermediate position or adjacent the discharge end maintained at a constant optimum temperature.

The term "vitreous" or "porcelain" enamel as herein used is intended to include glazes for coating of metals and the term "ceramic glaze" is intended to define a vitreous coating suitable for coating non-metal bases, as for example, pottery, porcelain and other clay bases or bases of which clay is the major constituent.

Porcelain enamels or metal glazes are in general a type of glaze which will adhere to metal bases when subjected to comparatively low temperatures, as for example 1200° F. to 1700° F. for comparatively short periods of time, as for example, 2 to 30 minutes, whereas, ceramic glazes are designed to be subjected to temperatures ranging from 1200° F. to 2600° F. or higher over periods of time ranging from 24 hours to several days. During the firing operation the porcelain enamel maintains a separate identity from the metal base, whereas the ceramic glaze dissolves or partially goes into solution in the clay base or body so that when the operation is completed the glaze merges into the body without any definite line of demarcation.

The term "short of chemical equilibrium" as used in the claims is intended to define that procedure in the smelting of porcelain enamels where the charge constituents are not fully chemically reacted one with the other, this being in counter-distinction to the glass making art where the charge constituents are smelted to chemical equilibrium so that the constituents are completely reacted. The valuable properties of porcelain enamels depend upon the charge constituents being smelted so that complete reaction between the charge constituents is prevented.

What is claimed is:

1. The method of continuously producing vitreous material, successive continuous portions thereof having uniform characteristics, said vitreous material being selected from the group consisting of enamels and glazes comprising, continuously introducing a raw vitreous-forming charge carrying an opacifying agent into a smelter having a hearth provided with a melting zone and a fining zone, melting said charge in the melting zone and imparting to the molten material substantially all of the thermal units necessary for the proper fining of the molten material, flowing said molten material to said fining zone and there fining said material to a state short of chemical equilibrium while maintaining a deep molten bath on the hearth in the fining zone, substantially no extraneous heat units being supplied to the bath in said fining zone during the major portion of the fining period, flowing the material away from the fining zone and solidifying and shattering the material.

2. The method of continuously producing vitreous material, successive continuous portions thereof having uniform characteristics, said vitreous material being selected from the group consisting of enamels and glazes comprising, continuously introducing a raw vitreous-forming charge carrying an opacifying agent into a smelter having a hearth provided with a melting zone and a fining zone, melting said charge in the melting zone and imparting to the molten material substantially all of the thermal units necessary for the proper fining of the molten material, flowing said molten material into said fining zone and there fining said material to a state short of chemical equilibrium while maintaining a deep molten bath on the hearth in the fining zone, substantially no extraneous heat units being supplied to the bath in said fining zone during the major portion of the fining period, flowing the material away from the fining zone while maintaining the molten material adjacent the end of the fining zone at a constant temperature, and solidifying and shattering the material.

3. The method of continuously producing vitreous material, successive continuous portions thereof having uniform characteristics, said vitreous material being selected from the group consisting of enamels and glazes comprising, continuously introducing a raw vitreous-forming charge into a smelter having a hearth provided with a melting zone and a fining zone, continuously heating said charge in the melting zone to melt and form a flowing mass of molten material and to simultaneously impart thereto substantially all of the thermal units necessary to effect the desired interaction of the constituents of the charge during fining, flowing the molten material into and through the fining zone and there fining the material by forming a deep molten bath in said fining zone containing sufficient heat units for the proper fining of said molten bath, continuously removing the so-treated material from the smelter, and solidifying and shattering said material.

4. The method of continuously producing vitreous material, successive continuous portions thereof having uniform characteristics, said vitreous material being selected from the group consisting of enamels and glazes comprising, continuously introducing a raw vitreous-forming charge carrying an opacifying agent into a smelter having a hearth provided with a melting zone, a fining zone and a discharge end, continuously heating said charge in the melting zone to melt and form a flowing mass of molten material and to simultaneously impart thereto substantially all of the thermal units necessary to effect the desired interaction of the constituents of the charge during fining, flowing the molten material into and through the fining zone to fine said material, laterally constricting the molten material adjacent the discharge end of the fining zone to form a deep molten bath in said zone containing sufficient heat units for the proper fining of said molten bath, substantially no extraneous heating units being supplied during the fining period, maintaining successive continuous portions of the molten material adjacent the end of the fining zone at a substantially constant temperature, continuously removing the so-treated material from the smelter, and solidifying and shattering said material.

5. The method of continuously producing vitreous material, successive portions thereof having uniform characteristics, said vitreous material being selected from the group consisting of enamels and glazes comprising, continuously introducing a raw vitreous-forming charge carrying an opacifying agent into a smelter provided with a melting zone and a fining zone, exposing said raw vitreous-forming charge in said melting zone to products of combustion having a temperature sufficiently high to melt a portion of said charge, form a flowing stream of molten material therefrom and to impart to the molten material substantially all of the thermal units necessary to effect the desired interaction of the stream constituents during fining, flowing said molten material into said fining zone to form a deep molten bath therein containing sufficient heat for the proper fining of the molten bath to a state short of chemical equilibrium and to maintain the opacifying properties of the opacifying agent present in the molten bath, fining the material continuously in said fining zone, continuously removing the so-treated material from the smelter, and solidifying and shattering said material.

6. The method of continuously producing vitreous material successive portions thereof having uniform characteristics, said vitreous material being selected from the group consisting of enamels and glazes comprising, continuously introducing a raw vitreous-forming charge into a smelter provided with a melting zone and a fining zone, exposing said raw vitreous-forming charge in said melting zone to products of combustion having a temperature sufficiently high to melt a portion of said charge, form a flowing stream of molten material therefrom and impart to the molten material substantially all of the thermal units necessary to effect the desired interaction of the stream constituents during fining, flowing said molten material into said fining zone, laterally constricting the molten material adjacent the discharge end of the smelter to form a deep molten bath in the fining zone containing sufficient heat units for the proper fining of the molten bath, fining said bath, continuously removing the so-treated material from the smelter, and solidifying and shattering said material.

7. In the method of continuously smelting on a smelting hearth, provided with a melting zone and a fining zone, vitreous-forming enamels or glazes derived from a charge including refractory fluxing and opacifying constituents, the steps of continuously heating said charge in said melting zone to melt and form a continuously flowing stream of molten material and simultaneously impart to said molten stream substantially all of the thermal units necessary to effect the desired interaction of the constituents of the charge during fining, flowing the molten material into the fining zone to form a deep molten bath from said molten stream containing sufficient heat units for the proper fining of the molten bath in the substantial absence of any further supplied heat units in said fining zone, and fining said bath to a state short of chemical equilibrium whereby to maintain the opacifying properties of the opacifying constituent present in the molten bath.

8. In the method of continuously smelting on a smelting hearth, provided with a melting zone and a fining zone, vitreous-forming enamels or glazes derived from a charge including refractory, fluxing and opacifying constituents, the steps of continuously heating said charge in said melting zone to melt and form a continuously flowing stream of molten material and simultaneously impart to said molten stream substantially all of the thermal units necessary to effect the desired interaction of the constituents of the charge during fining, flowing the molten material into said fining zone to form a deep molten bath from said molten stream containing sufficient heat units for the proper fining of the molten bath in the substantial absence of any further supplied heat units in said fining zone, fining said bath to a state short of chemical equilibrium whereby to maintain the opacifying properties of the opacifying constituent present in the molten bath, and maintaining successive continuous portions of the molten material adjacent the end of the fining zone at a substantially constant temperature.

9. In the method of continuously smelting on a smelting hearth provided with a melting zone and a fining zone vitreous-forming enamels or glazes derived from a charge including refractory and fluxing constituents, the steps of continuously heating said charge in said melting zone to melt and form a continuously flowing stream of molten material and simultaneously impart to said molten stream substantially all of the thermal units necessary to effect the desired interaction of the constituents of the charge during fining, flowing the molten material into the fining zone, laterally constricting the molten material adjacent the end of the fining zone to form in said zone a deep molten bath containing sufficient heat units for proper fining of the molten bath in the substantial absence of any further supplied heat units in said fining zone, fining said bath to a state short of chemical equilibrium, and maintaining successive continuous portions of the molten material adjacent the end of the fining zone at a substantially constant temperature.

10. The method of continuously producing vitreous materials selected from the group consisting of vitreous enamels and glazes comprising, continuously introducing a vitreous-forming charge into a smelter having a melting hearth, and a fining hearth provided adjacent the discharge end thereof with a laterally constricted portion, forming on said melting hearth from said charge a reservoir of raw material, exposing said reservoir of material to products of combustion generated by a fuel supply, said products of combustion being at a temperature sufficiently high to melt the surface thereof whereupon a flowing stream of molten material is formed, and to impart to the molten material substantially all the thermal units necessary to effect the desired interaction of the stream constituents during fining, flowing said molten material onto said fining hearth and fining the material thereon, substantially no extraneous heat being supplied during the major portion of the fining period, regulating the amount of heat supplied per unit of time to said reservoir of material to maintain the temperature of the fined material substantially constant at and adjacent the laterally constricted portion of the fining hearth, continuously removing the so-treated material from the smelter, and solidifying and shattering said material.

11. The method of continuously producing vitreous materials selected from the group consisting of vitreous enamels and glazes comprising, continuously introducing a vitreous-forming charge into a smelter having a heater unit, a melting hearth, and a fining hearth, the latter being provided adjacent the discharge end thereof with a laterally constricted portion, heating said charge on the melting hearth and the charge surface to melt and form a flowing stream of molten material and to impart to the molten material substantially all of the thermal units necessary to effect the desired interaction during fining of the stream constituents, flowing said molten material onto said fining hearth and there fining, by constricting the molten material adjacent the discharge end of the smelter to form a deep molten bath containing sufficient heat units for the proper fining of the molten bath in the substantial absence of any further supplied heat units during fining, regulating the amount of heat units supplied to said charge to maintain the temperature of the fined material constant at and adjacent the laterally constricted portion of the fining hearth, continuously removing the so-treated material from the smelter, and solidifying and shattering said material.

12. The method of continuously producing a vitreous material selected from the group consisting of vitreous enamels and glazes comprising, continuously introducing a vitreous-forming charge into a smelter having a heater unit, a flat melting hearth and a flat fining hearth, the latter being provided adjacent the discharge end thereof with a laterally constricted portion, heating said charge on the melting hearth and the charge surface thereof to melt and form a flowing stream of molten material and to impart to the molten material substantially all of the thermal units necessary to effect the desired interaction during firing of the stream constituents, flowing said molten material onto said fining hearth and there fining, by laterally constricting the molten material adjacent the discharge end of the smelter to form a molten bath not exceeding seven inches in depth containing sufficient heat units for the proper fining of the molten bath in the substantial absence of any further supplied heat units during fining, regulating the amount of heat supplied per unit of time to said charge to maintain the temperature of the fined material substantially constant at and adjacent the laterally constricted portion of the fining hearth, continuously removing the so-treated material from the smelter, and solidifying and shattering said material.

13. The method of continuously producing vitreous material successive portions thereof having uniform characteristics, said vitreous material being selected from the group consisting of enamels and glazes comprising, continuously introducing a raw vitreous-forming charge into a smelter provided with a melting zone and a fining zone, melting said charge in said melting zone and imparting to the molten material substantially all of the thermal units necessary to effect the desired interaction of the charge constituents during fining, flowing said molten material into said fining zone and there fining, laterally constricting the molten material adjacent the discharge end of the smelter to provide a deep molten bath containing sufficient heat units for the proper fining of the molten bath, continuously removing the so-treated material from the smelter, and solidifying and shattering said material.

14. The method of continuously producing vitreous materials selected from the group consisting of vitreous enamels and glazes comprising, continuously introducing a vitreous-forming charge into a smelter having a melting hearth, and a fining hearth provided adjacent the discharge end thereof with a laterally constricted portion, melting said charge on said melting hearth and imparting to the molten material substantially all of the thermal units necessary to effect the desired interaction of the charge constituents during fining, flowing said molten material onto said fining hearth and there fining, laterally constricting the molten material adjacent the discharge end of the smelter to form a deep molten bath containing sufficient heat units for the proper fining of the molten bath, regulating the amount of heat supplied per unit of time to said charge to maintain the temperature of the fined material substantially constant at and adjacent the laterally constricted portion of the fining hearth, continuously removing the so-treated material from the smelter, and solidifying and shattering said material.

RICHARD H. TURK.